US006671931B1

(12) United States Patent
Duncan

(10) Patent No.: US 6,671,931 B1
(45) Date of Patent: Jan. 6, 2004

(54) VIBRATING HAMMER GLOVE

(76) Inventor: David Duncan, 28315 W. Industry Dr., Valencia, CA (US) 91355

(*) Notice: Subject to any disclaimer, the term of this patent is extended or adjusted under 35 U.S.C. 154(b) by 38 days.

(21) Appl. No.: 10/179,490

(22) Filed: Jun. 24, 2002

Related U.S. Application Data

(60) Provisional application No. 60/300,447, filed on Jun. 25, 2001.

(51) Int. Cl.[7] .......................... A47J 45/00; B25G 25/00

(52) U.S. Cl. ............................ 16/435; 16/430; 16/431; 16/DIG. 12; 173/162.2; 173/171; 81/177.1

(58) Field of Search ................................ 16/110.1, 421, 16/422, 430, 431, 435, DIG. 12; 81/20, 22, 177.1; 220/903, 753, 739; 173/90, 93.5, 162.1, 162.2, 210, 171, DIG. 2; 72/476; 206/372–379; 125/40

(56) References Cited

U.S. PATENT DOCUMENTS 3,019,673 A * 2/1962 Sjostrand et al. ........... 173/219
5,347,684 A * 9/1994 Jackson ....................... 16/421
5,469,601 A * 11/1995 Jackson ....................... 16/421
5,842,584 A * 12/1998 Baird ......................... 206/379
5,867,868 A * 2/1999 Ward ........................... 16/422
5,992,540 A * 11/1999 Smolinski et al. .......... 173/169
6,006,403 A * 12/1999 Battiato ....................... 16/421
6,155,354 A * 12/2000 Pusateri et al. ............. 173/170
6,161,256 A * 12/2000 Quiring et al. ............... 16/431
6,199,383 B1 * 3/2001 Pusateri ...................... 173/171

* cited by examiner

*Primary Examiner*—Anthony Knight
*Assistant Examiner*—Christopher Boswell
(74) *Attorney, Agent, or Firm*—Roger A. Marrs

(57) ABSTRACT

A vibrating hammer glove having a motor housing cover with a palm portion across the top of a hammer housing includes downwardly depending flaps which wrap around the housing and fasten with a stationary fitting. Further, a securement strap is trained through slots in the flaps so that the terminating ends thereof engage in a hook and pile fastener. A cushion between the palm portion of the cover and the underside of the strap provides additional shock and vibration absorption. A securement ring midway between opposite strap ends engages the stationary fitting so that the strap and glove are properly aligned, mounted, and retained on the housing. Air vents are provided in the palm portion and in the attachment flaps, whereby heat generated within the housing is dissipated to the environment.

12 Claims, 4 Drawing Sheets

VIBRATING HAMMER GLOVE

Priority Claimed on Ser. No. 60/300,447 filed Jun. 25, 2001.

BACKGROUND OF THE INVENTION

1. Field of the Invention

The present invention relates to the field of vibrating hand tools, and more particularly to a novel glove or padding assembly which fits over a conventional vibrating hammer normally held in the hand of the user and which protects the user's hand from injury.

2. Brief Description of the Prior Art

In the past, it has been the conventional practice to use vibrating hammers which include a housing for enclosing a motor and a reciprocating hammering member. The housing is held in the palm of the user's hand and when energized the reciprocating hammer is employed to impact against nails or other fastening devices in order to provide securement. Normally, the housing for the motor is composed of a metal which is hard and which transfers any impact loading and vibration into the hand and arm of the user. Also, the motor generates heat and the elevated temperature is passed through the metal housing to the hand of the user. Injury to the user's hand and skin is often times experienced when using the ergonomically inefficient metal housing without any protection for the user's hand.

Therefore, a long-standing need has existed to provide a means for reducing or absorbing shock transferred to the user's hand during impacting of a nail or the like when using a conventional impact or vibrating hammer. Also, a better means is needed permitting the user to grip the metal housing so as to avoid slippage or dropping of the hammer during a nailing procedure.

SUMMARY OF THE INVENTION

Accordingly, the above problems and difficulties are avoided by the present invention which provides a novel impact or vibrating hammer glove having motor housing cover with a palm portion residing across the top of a hammer housing and with downwardly depending attachment flaps which wrap around the housing and detachably fasten with a stationary fitting holding a reciprocating hammer head within the housing. The glove further includes a securement strap that is trained through slots in selective ones of the flaps so that the terminating ends thereof engage in a buckle loop and a hook and pile fastener. An additional cushion is placed between the palm portion of the cover and the underside of the strap to provide additional shock and vibration absorption. The strap includes a securement ring midway between its opposite ends which is intended to reside around the stationary fitting on the motor housing as well as the reciprocating hammer head so that the strap and the glove are properly aligned, mounted, and retained. Air vents are provided in the palm portion of the cover as well as in selected and critical locations on the attachment flaps so that heat generated by the motor within the housing may readily be dissipated to the environment.

Furthermore, some conventional impact or vibrating hammers include a tubular handle which outwardly projects from the motor housing and a glove or cover is provided for detachably mounting onto the handle so that the user's hand is fully protected from shock and vibration damage.

Therefore, it is among the primary objects of the present invention to provide a shock and vibration absorbing glove or cushion assembly which is ergonomically efficient so as to protect the user's hand from damage or injury due to shock, vibration or heat conditions.

Another object of the present invention is to provide a novel cushioned glove or assembly which is resistant to heat or cold and which will protect the user's skin and hand from any extreme temperature conditions generated by the tool's motor.

Still another object of the present invention is to provide a novel pneumatic hammer glove which not only absorbs shock and vibration but which reduces grip fatigue and protects the user's hand from injury.

A further object resides in providing a hook and pile strap fastener for holding the impact hammer or nailer to the user's palm to avoid slippage or dropping of the hammer during a hammering procedure.

A further object resides in providing materials for a hammer cover which insulates against heat or cold conditions and which fully absorbs shock and vibration during a nailing or hammering procedure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF PREFERRED EMBODIMENT

Figure 1:
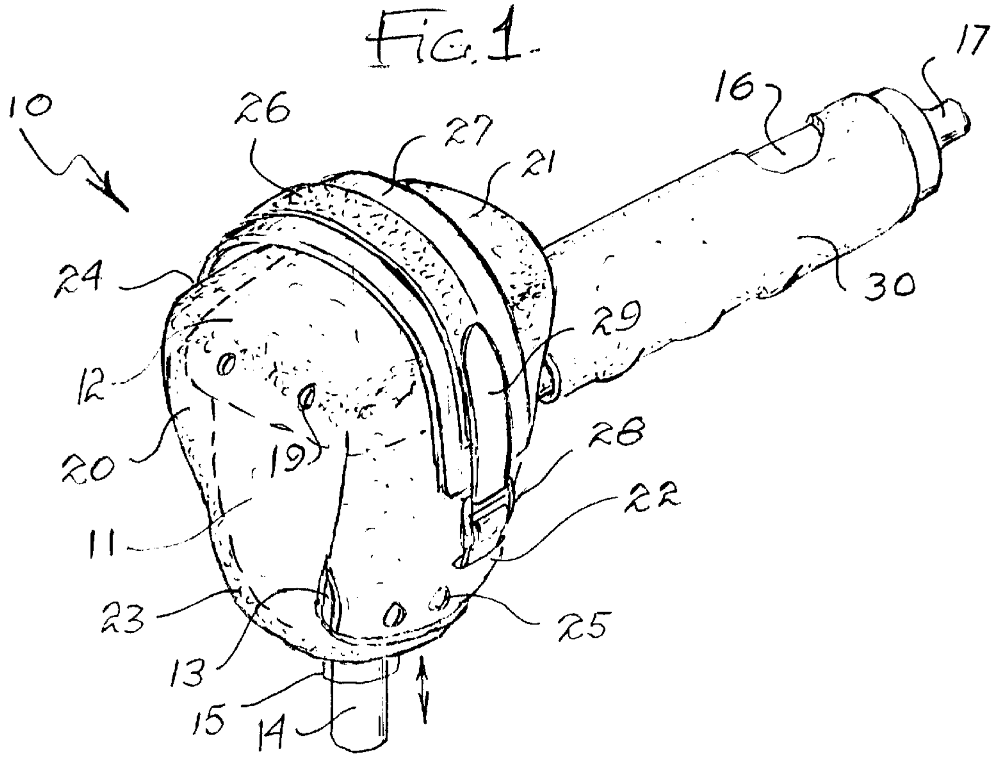
FIG. 1 is a front perspective view illustrating the novel pneumatic hammer glove incorporating the present invention.

Referring to FIG. 1, the novel vibrating and impact hammer glove incorporating the present invention is illustrated in the general direction of arrow 10. The glove is employed for covering a motor housing 11 illustrated in broken lines. The housing includes a palm portion 12 and a motor portion 13. Downwardly projecting from the underside of the housing 11 is a reciprocating hammer head 14 adapted to move in and out of a fixture 15 when the motor is energized. Outwardly projecting from the rear of housing 11 is a handle 16 having a connector 17 adapted to be detachably connected with a source of pneumatic pressure.

In one conventional form of impact hammer, the motor is operated pneumatically so as to cause the reciprocating hammer head 14 to move in and out in a rapid fashion from the fitting 15.

The glove 10 includes a housing cover 20 that has a section 21 covering the palm portion 12 of the housing and further includes downwardly depending attachment straps 22, 23 and 24 respectively. Air vents 19 and 25 are provided in the section 21 end flaps so as to permit exhaust gasses or heat generated by the pneumatic motor to exit the housing 11 into the atmosphere.

The glove further includes an attachment strap 26 which includes a cushion member 27 disposed between the underside of strap and the top of section 21. The opposite ends of cushion extend downwardly over a portion of flaps 22 and 24. The strap includes opposite ends which are detachably connected together means of a buckle 28 and retention of the strap end is achieved means of a hook and pile fastener joining the ends together as resented by strap end 29.

FIG. 1 further illustrates that the handle 16 is covered h a cushion cover 30 that extends along its entire length. In view of the foregoing, it can be seen that the glove 10 which includes glove 20 and cushion 30 provides a shock-absorbing and at and cold resistant barrier between the user's hand and the motor housing 11 and handle 16. Therefore, the adverse effects of hammering caused by the reciprocating hammer head 14 do not damage injure the user's hand.

Figure 3:
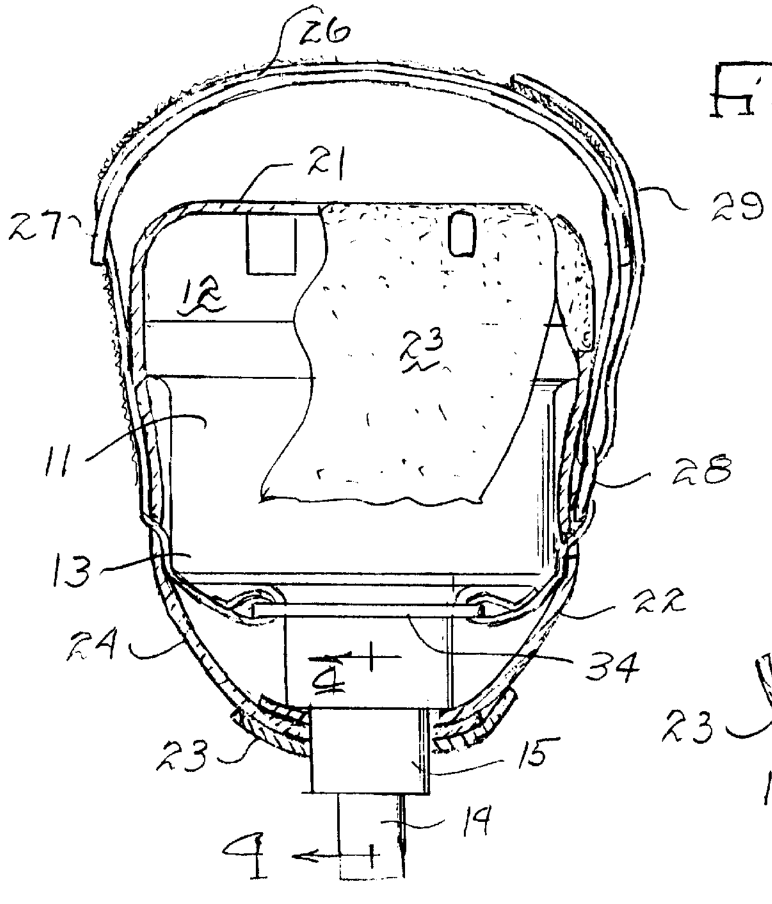
FIG. 3 is a front elevational view, partly in section, illustrating the pneumatic hammer glove fully assembled as shown in FIG. 1.
Figure 2:
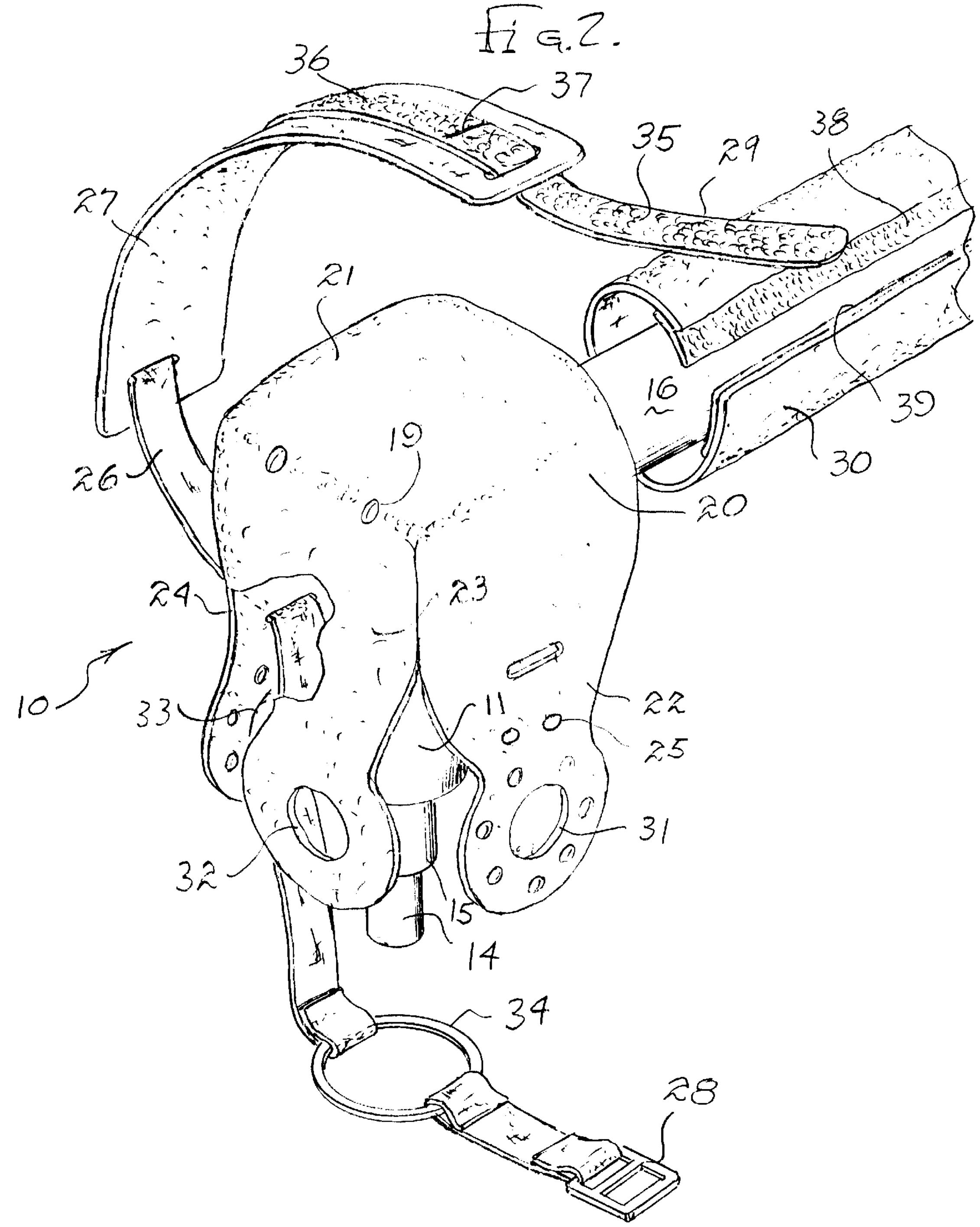
FIG. 2 is an exploded perspective view showing the various components of the pneumatic hammer glove as illustrated in FIG. 1.

Referring now in detail to FIGS. 2 and 3, it can be seen at the downwardly depending flaps 22, 23 and 24 include openings indicated by numerals 31, 32, and 33 respectively. The flaps are folded about the housing portion 13 and the impact hammer head 14 is inserted through all three of the openings. Thus, the glove or cover 10 is completely surrounding the motor housing and the flaps are attached to the fixture 15 by an interference fit. Also, it is to be seen that the strap 26 includes a metal ring 34 that is slipped over the hammer head 14 and the fitting 15 to reside against the underside of the portion 13 of housing 11. FIG. 3 more clearly illustrates the position and the ring is inserted into this position preparatory for inserting the hammer head 14 through the holes 31-33 inclusive.

FIG. 2 further illustrates that the two-component hook and pile fastener is carried on the strap 26 and that the terminating end 29 may be folded over upon itself so that the two components can be mated together. One component is indicated on the underside of end 29 by numeral 35 while the other component is indicated by numeral 36 carried on the top side of the strap. The separation between the two components is indicated by line 37.

FIG. 2 also shows that the cover 30 for handle 16 includes a two-component hook and pile fastener such as indicated by component 38 and component 39. When joined together, the cushion cover 30 completely surrounds the handle 16.

Figure 4:
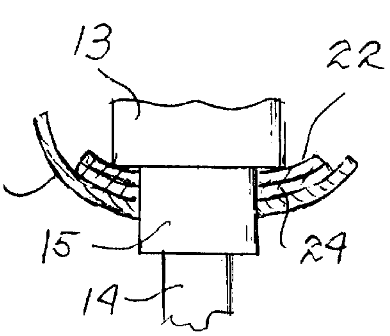
FIG. 4 is an enlarged, fragmentary sectional view as taken in the direction of arrows 4—4 of the FIG. 3.

FIG. 4 further illustrates the overlapping of the attachment flaps 22-24 about the fixture 15 after insertion over the hammer head 14.

Figure 5:
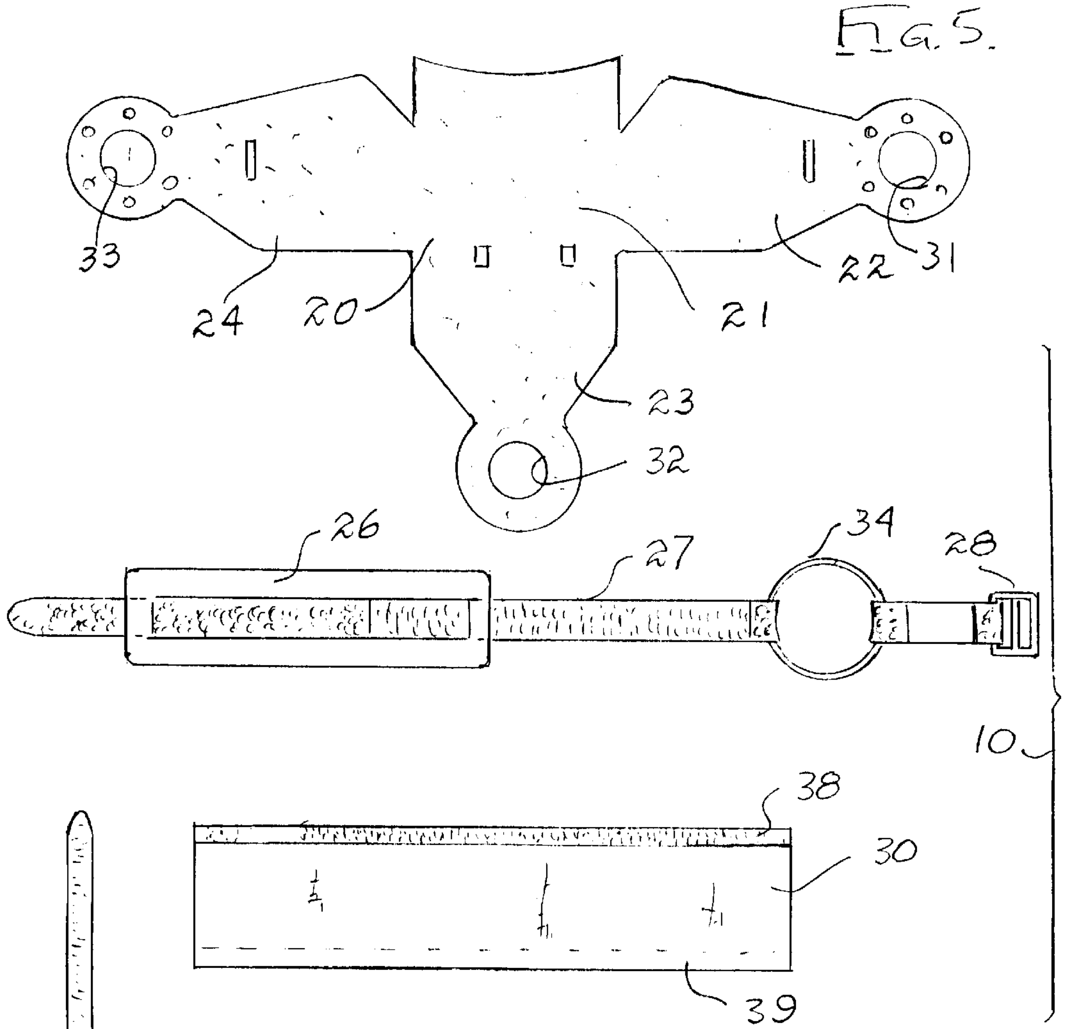
FIG. 5 is a plan view of the various components used in the pneumatic hammer glove embodiment shown in FIGS. 1–4.

In FIG. 5, a layout diagram is presented illustrating the three components which comprise the glove 10. Namely, the housing cover 20, the strap 26 and the handle cover 30.

Figure 6:
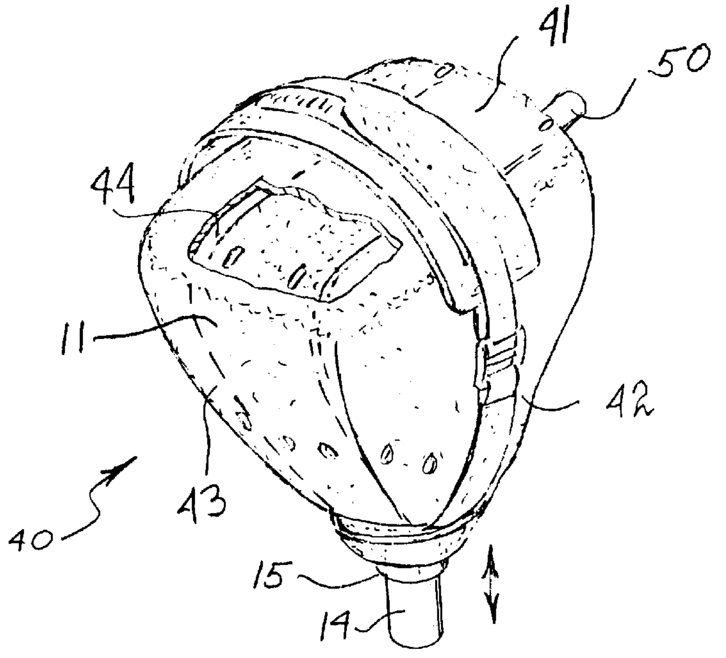
FIG. 6 is a front elevational view of another version of a pneumatic hammer glove incorporating the present invention.
Figure 7:
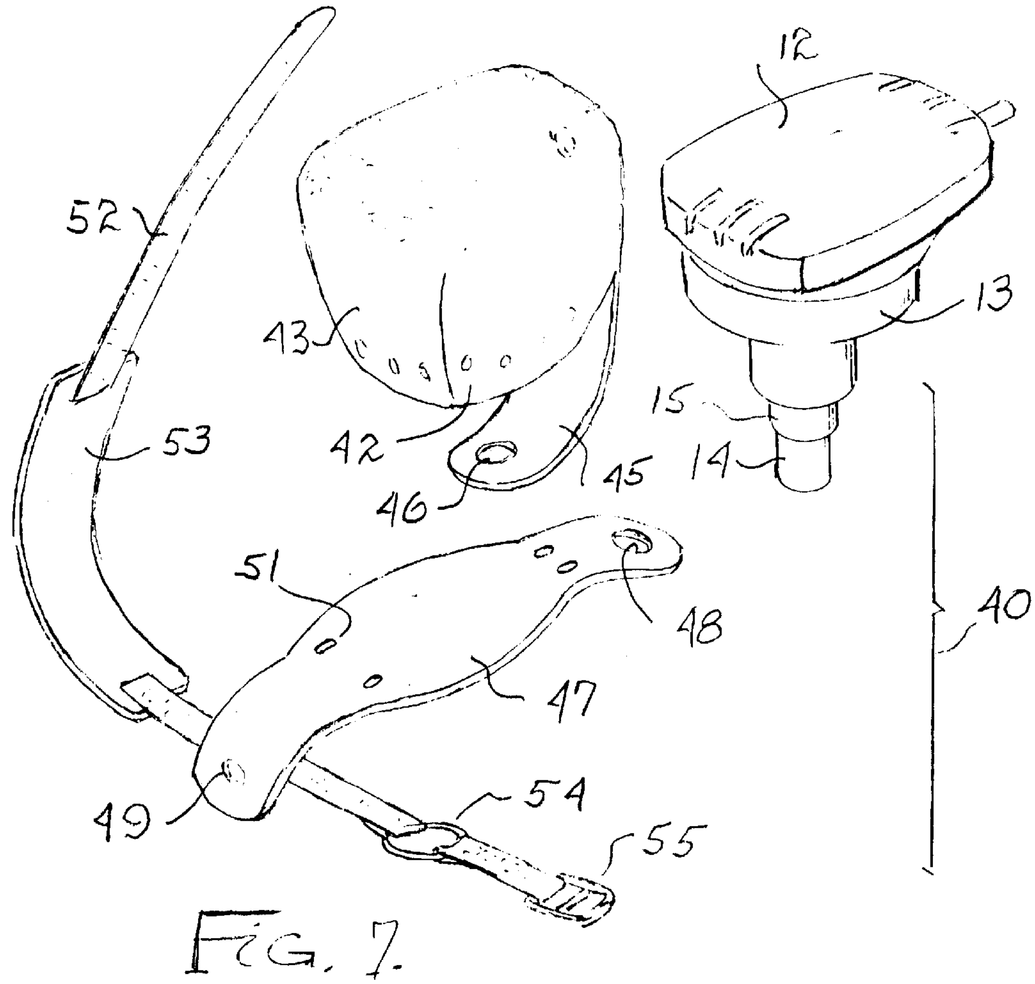
FIG. 7 is a perspective view illustrating the components of the embodiment shown in FIG. 6 preparatory for assembly onto a pneumatic hammer.

Referring to FIGS. 6 and 7, another version of the present invention is illustrated wherein the motor housing 11 supports a cover indicated in the direction of arrow 40. The cover includes a top portion 41 with downwardly depending flaps indicated by numeral 42 as a side flap, numeral 43 as a front flap, and numeral 44 as a flap on the opposite side of the cover from the side having flap 42. A rear flap is indicated by numeral 45 and includes an opening 46 for insertably receiving the impact hammer head 14 so as to reside over the fixture 15. Also included in the combination and the assembly is a strip 47 having opposite ends provided with openings 48 and 49. Opening 48 may be placed about an input port 50 through which a source of pneumatic pressure may be detachably connected. Opening 49 is placed around the hammer head 14 and over the fixture 15. The strip 47 includes vents such as vent opening 51. For assembly purposes, a strap 52 is employed with a cushion 53 having a ring 54 and a buckle 55 at its opposite end. The strap, cushion, ring 54 and buckle 55 are employed in the same fashion as previously described with respect to strap 26. Also, a two-component hook and pile fastener is employed so that the end of strap 52 when inserted through the buckle 55 may be folded over upon itself and the two-component fastener attached.

Figure 8:
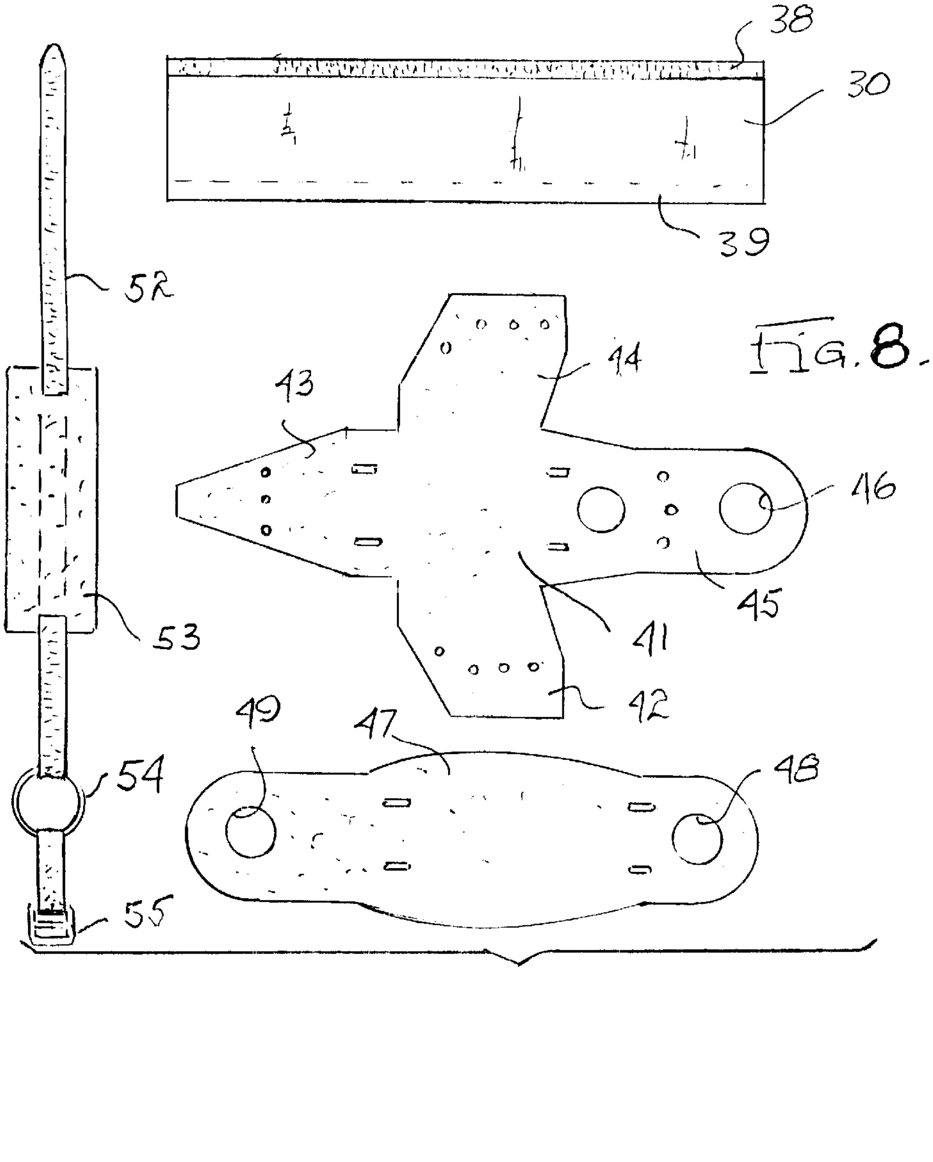
FIG. 8 is a plan view of the various components employed in the embodiment shown in FIGS. 6 and 7.

Referring to FIG. 8, a layout of the three components forming the assembly shown in FIG. 6 and 7 is illustrated with identical numbers corresponding to the respective components and construction elements.

In view of the foregoing, it can be seen that the glove incorporating the present invention is suitable for pneumatic hammers and that the cushioned material forming the cover, the cushion and the strap, readily absorb shock and greatly reduces grip fatigue when the user is using the hammer. The housing of the hammer itself is protected and hook and pile strap holds the nailer to the user's palm. With respect to this usage, it can be seen from FIG. 3 in particular that a substantial space is provided between the underside of strap 26 and cushion 27 so that the user's hand can readily fit in the space. The user's palm will rest against the top 21 of the cover and the underside of the cushion 27 will be on the top of the user's hand. The strap can be tightened on the buckle 28 and the hook and pile fastener component can readily attach to provide the proper tension to maintain the user's palm on the tool. It is also to be noted that the material of the glove, particularly the cover, of either embodiment is of a composition which insulates against heat or cold temperatures.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A glove for an impact or vibration hammer comprising:

a housing cover having a palm portion with outwardly extending attachment flaps;

said attachment flaps extend from opposite sides of said palm portion and said flaps include a pair of coaxial openings disposed adjacent to each other; and a securement strap trained about said housing cover engaging said attachment flaps and said palm portion.

2. The glove defined in claim 1 wherein:

said strap includes a securement ring disposed mid-way between a pair of strap terminating ends and said ring being coaxially disposed with respect to said pair of openings.

3. The glove defined in claim 2 wherein:

said strap terminating ends detachably coupled together by a loop and a hook and pile fastener combination.

4. The glove defined in claim 3 including:

a third flap outwardly projecting from said palm portion between said pair of attachment flaps and having an opening coaxially disposed with respect to said openings in said attachment flaps.

5. The glove defined in claim 4 wherein:

said palm portion, said attachment flaps and said third flap constitute a single, one-piece unitary construction with said attachment flaps and said third flap being foldable on said palm portion to be deployed about said palm portion.

6. The glove defined in claim 5 including:

a cushion pad secured to said strap in abutting engagement with said palm portion.

7. In a glove for placement about the housing of an impact hammer with a fixture holding a reciprocating hammer, the combination comprising:

a single unitary blank having a central palm portion and at least a pair of attachment flaps extending from opposite sides of said palm portions;

said attachment flaps having coaxial overlapping openings;

a securement strap disposed on said palm portion having terminating ends extending along said pair of attachment flaps;

hook and pile coupling means carried on said opposite ends;

a retainer ring carried on said strap midway between said terminating ends; and said pair of flaps extending along said housing with said coaxial openings and said ring fitted about said fixture.

8. The glove defined in claim 7 including:

a third flap carried on said palm portion between said pair of flaps and having a third opening for insertably receiving said fixture in cooperation with said openings in said pair of flaps and said retaining ring.

9. The glove defined in claim 8 including:

said housing further having an elongated handle outwardly projecting from said housing; and a handle cushion carried on said handle and a hook and pile fastening means carried on said cushion for detachably securing said cushion on said handle.

10. The glove defined in claim 9 wherein:

said third flap is a separate member disposed between said palm portion and said housing; and said third flap having a pair of securement openings cooperating about said fixture to retain said unitary construction on said housing.

11. The glove defined in claim 9 wherein:

said unitary construction is composed of a soft, pliable composition.

12. The glove defined in claim 11 wherein:

each of said flaps includes vent holes for conducting heat from said housing to ambient atmosphere.

* * * * *